United States Patent
Luski et al.

(10) Patent No.: US 6,752,842 B2
(45) Date of Patent: Jun. 22, 2004

(54) MANUFACTURE OF FLEXIBLE THIN LAYER ELECTROCHEMICAL CELL

(75) Inventors: Shalom Luski, Rehovot (IL); Zvi Nitzan, Petach Tikvah (IL)

(73) Assignee: Power Paper Ltd., Petach Tikva (IL)

( * ) Notice: Subject to any disclaimer, the term of this patent is extended or adjusted under 35 U.S.C. 154(b) by 71 days.

(21) Appl. No.: 09/882,051

(22) Filed: Jun. 18, 2001

(65) Prior Publication Data

US 2002/0192542 A1 Dec. 19, 2002

(51) Int. Cl.$^7$ .......................... H01M 10/38; H01M 6/14
(52) U.S. Cl. ................................... 29/623.3; 29/623.5
(58) Field of Search ............................ 29/623.3, 623.5

(56) References Cited

U.S. PATENT DOCUMENTS

| | | | |
|---|---|---|---|
| 3,912,543 A | * | 10/1975 | Delahunt |
| 4,152,825 A | * | 5/1979 | Brunear ..................... 29/623.2 |
| 5,100,746 A | * | 3/1992 | Muller et al. .......... 29/623.3 X |
| 5,470,357 A | * | 11/1995 | Schmutz et al. ........... 29/623.5 |

* cited by examiner

*Primary Examiner*—John S. Maples
(74) *Attorney, Agent, or Firm*—G. E. Ehrlich (1995) Ltd.

(57) ABSTRACT

A flexible thin layer electrochemical cell and a method of using a lamination process for manufacture thereof, the cell having a plurality of layers including a first electrode layer and a second electrode layer with a separator interspersed therebetween and wherein the separator serves as a lead element upon which the other layers are laminated using an adhesive frame mounted on the lead element.

15 Claims, 3 Drawing Sheets

MANUFACTURE OF FLEXIBLE THIN LAYER ELECTROCHEMICAL CELL

FIELD AND BACKGROUND OF THE INVENTION

The present invention relates to a flexible thin layer electrochemical cell and more particularly, but not exclusively, to materials for the manufacture of such a cell and a method of manufacture thereof.

The present invention relates to the manufacture of electrochemical cells which are used as power sources by converting chemical energy to electrical energy, including batteries and other types of electrochemical components which share structural features therewith, including in particular capacitors and electrolytic capacitors. More particularly, the present invention relates to a primary or rechargeable electrochemical cell to be used as a primary or rechargeable battery which accomplishes the conversion of chemical energy to electrical energy using perhaps a wet (e.g., liquid state) electrolyte, yet maintains a flexible thin layer configuration.

The most common type of battery is the cylindrical battery. Cylindrical batteries include the bobbin type, in which one electrode is a central axis and the other electrode is outwardly located of the cylinder with electrolyte and a separator therebetween.

A second type of cylindrical battery is the jellyroll battery. In the jellyroll battery, an anode and a cathode are wound tightly around a mandrel with a separator therebetween.

The ever-growing development of miniaturized and portable electrically powered devices such as for example cellular phones, voice recording and playing devices, watches, motion and still cameras, liquid crystal displays, electronic calculators, IC cards, temperature sensors, hearing aids, pressure sensitive buzzers, etc., has generated a need for compact batteries for their operation. Currently popular for such applications are button cells which comprise flattened cylinders having an upper closure and a lower closure. One electrode is attached to the upper closure and the second electrode is attached to the lower closure of the button. The two halves of the cylinder are then sealed together to form the complete battery.

Nevertheless, the button battery has a relatively large thickness due to its need for upper and lower surrounding metal walls. The dimensions of the battery bound the extent of miniaturization for many devices.

There thus arises a need for reliable thin layer electrochemical cells to be used as batteries.

Batteries can be broadly classified into three categories in which batteries of the first category include wet electrolytes (i.e., liquid state batteries), and batteries of the second category include solid state electrolyte. There is also a third, gel type.

Solid state batteries have an inherent advantage, they do not dry out and do not leak, they suffer major disadvantages when compared with liquid state batteries since, due to limited diffusion rates of ions through a solid, their operation is temperature dependent to a much larger extent, and many operate well only under elevated temperatures. Furthermore, the limited diffusion rates result in batteries with low ratio of electrical energy generated vs. their potential chemical energy.

Liquid state thin layer batteries typically include a positive and negative active insoluble material layer put together with a separator interposed therebetween, which separator is soaked with a liquid electrolyte solution, thus functioning as an electrolytic liquid layer. Such batteries, examples of which are disclosed in U.S. Pat. No. 4,623,598 to Waki et al., and in Japanese Pat. No. JP 61-55866 to Fuminobu et al., are sealed within a sheathing film to prevent liquid evaporation, and therefore form closed electrochemical cells. Being closed cells, these batteries tend to swell upon storage due to evolution of gases which is a fatal problem in thin layer batteries having no mechanical support, the pressure imposed by the accumulated gases leads to layer separation, thus rendering the battery inoperative.

Means to overcome this problem include (i) the use of a polymer increased viscosity agent, such as hydroxyethylcellulose, applied to adhere (i.e., glue) the battery layers together, thus overcoming the problem of lack of solid support; and, (ii) the addition of mercury, which is particularly useful in the prevention of hydrogen formation.

It is noted, however, that the polymer is limited in its effectiveness and the mercury is an environmental hazard. Thus the problems are not successfully overcome.

A way to solve the swelling problem was disclosed in U.S. Pat. No. 3,901,732 to Kis et al. in which a gas-permeable electrolyte-impermeable polymeric material which allows venting of undesirable gases formed within the battery while preventing any electrolyte loss from the battery is used as a sheathing film to enclose the battery cell.

However, a more direct and efficient way to avoid undesired gas accumulation in liquid state thin layer batteries would be to provide these batteries as open cells for facilitated release of gases, while at the same time to provide means to avoid liquid evaporation and drying out of the battery.

U.S. Pat. 5,652,043 thus provides a flexible thin layer open liquid state electrochemical cell, which can be used as a primary or rechargeable power supply for various miniaturized and portable electrically powered devices of compact design. The cell includes a wet electrolyte, yet maintains a flexible, thin and open configuration, thus devoid of accumulation of gases upon storage. The cell comprising a first layer being an insoluble negative pole, a second layer being an insoluble positive pole and a third layer being aqueous electrolyte, the third layer being disposed between the first and second layers and including a deliquescent material for keeping the open cell wet at all times; an electroactive soluble material for obtaining required ionic conductivity; and, a water-soluble polymer for obtaining a required viscosity for adhering the layers. The electrochemical cell therein described is preferably produced using a suitable printing technology.

International Patent Application WO 98/56458 discloses a flexible thin layer open cell and discusses a method of manufacture thereof.

Flexible thin layer lithium cells were reported in Scientific American October 1997, as follows:

The lithium power source is a recent development in mobile power sources. The battery is flat and flexible, like a stick of chewing gum (one of its manufacturers refers to its product as a film battery because its batteries are also reminiscent of film frames). These batteries, which could soon be as thin as 0.2 millimeter, can be manufactured in long, continuous strips, which should reduce production costs. Both NiCd and NiMH cells can also be produced using the chewing gum format.

Generally, a battery of the above-described kind is manufactured by printing different layers one on top of the other.

Manufacture begins with a first electrode, upon which a separator containing electrolyte is printed, and then a second electrode may be printed over that. The layers are packaged in plastic; the plastic layers being attached from around the edges by the insertion of a sealing compound.

SUMMARY OF THE INVENTION

According to a first aspect of the present invention there is thus provided a method of using a lamination process to make a flexible thin layer electrochemical cell having a plurality of layers including a first and a second electrode layer with a separator in between and wherein the separator serves as a lead element upon which the other layers are laminated, According to a second aspect of the present invention there is provided a method of manufacturing a thin layer electrochemical cell comprising the steps of:

providing a separator layer;

providing a positive electrode layer, providing a negative electrode layer, and laminating together the positive and negative electrode layers onto the separator layer.

A preferred embodiment comprises the step of impregnating a nonconductive material to form a non-conductive region within at least one of the layers.

Preferably, the step of laminating further comprises impregnating a non-conductive material to form a non-conductive sealed region within at least one of the layers.

Preferably, the non-conduction region is formed as a border defining an outer boundary of the cell.

Preferably, the non-conduction region extends through at least two of the layers.

Preferably, the non-conduction region extends through all three of the layers.

Preferably, the thin layer electrochemical cell is an open thin layer electrochemical cell.

A preferred embodiment comprises the step of applying a partial layer of non-conduction material to the separator layer.

Preferably, the non-conductive material is an adhesive material.

Preferably, the adhesive material is any one of a group comprising urethane acrylate, epoxy acrylate, other cross-linked acrylates, and cured acrylates.

Preferably, the non-conduction material is selected from the group consisting of a hot melt material, a hot melt pressure sensitive material and a UV curable pressure sensitive material.

A preferred embodiment comprises comprising the step of adding an impregnation agent to the partial layer.

Preferably, the impregnation agent is selected from the group consisting of polyisobutylene, ethyl cellulose, a fluoro polymer, an acrylic resin, a vinyl resin, and polyurethane.

According to a third aspect of the present invention there is provided a separator layer for use in the production of a flexible thin layer electrochemical cell, the separator layer comprising an impregnator applied thereto, which impregnator is susceptible to impregnate the separator layer during lamination processing applied to the layer to form the cell.

Preferably, the impregnator comprises an adhesive material.

Preferably, the adhesive material is selected from the group consisting of a hot melt material, a hot melt pressure sensitive material and a UV curable pressure sensitive material.

Preferably, the impregnator comprises an impregnation agent operable to cause impregnation into at least one of the layers of at least one material of the impregnator.

Preferably, the impregnator is operable to restrict electrical conductivity in a region of any electrically conductive layer into which it is absorbed.

Preferably, the impregnation agent is selected from the group consisting of polyisobutylene, ethyl cellulose, a fluoro polymer, an acrylic resin, a vinyl resin, and polyurethane.

A preferred embodiment has a first side and a second side and the impregnator is applied on both of the first side and the second side for lamination thereto of further layers to form the cell.

A preferred embodiment has a positive electrode layer laminated to the first side and a negative electrode layer laminated to the second side, each electrode layer further comprising electrolyte.

According to a fourth aspect of the present invention there is provided a flexible thin layer open electrochemical cell comprising a plurality of layers laminated to one another.

In a preferred embodiment, layers comprise a conduction inhibitor absorbed within the layers to form non-conduction regions.

In a preferred embodiment, the conduction inhibitor comprises an adhesive material.

In a preferred embodiment, the adhesive material being is selected from the group consisting of a hot melt material, a hot melt pressure sensitive material and a UV curable pressure sensitive material.

In a preferred embodiment, the conduction inhibitor further comprises an impregnation agent.

In a preferred embodiment, the impregnation agent including is selected from the group consisting of polyisobutylene, ethyl cellulose, a fluoro polymer, an acrylic resin, a vinyl resin, and polyurethane.

Preferably, the non-conducting regions are arranged to define borders of the cell.

Preferably, the adhesive is suitable for laminating the layers together in a lamination process.

Preferably, the base layer comprises an impregnator located thereon, which impregnator is operable to impregnate the separator layer during lamination processing applied to the layer to form the cell.

Preferably, the impregnator comprises an adhesive suitable for adhering the layers during lamination processing.

Preferably, the adhesive is selected from the group consisting of a hot melt material, a hot melt pressure sensitive material and a UV curable pressure sensitive material.

Preferably, the impregnator further comprises an impregnation agent operable to cause impregnation into the layers of at least one material of the impregnator.

Preferably, the impregnation agent is selected from the group consisting of po, ethyl cellulose, a fluoro polymer, an acrylic resin, a vinyl resin, and polyurethane.

A preferred embodiment comprises a first side and a second side and the impregnator is superimposed on both of the first side and the second side for lamination thereto of further layers to form the cell.

A preferred embodiment comprises a positive electrode layer laminated to the first side and a negative electrode layer laminated to the second side, each electrode layer further comprising electrolyte.

Preferably, the impregnation region extends into the electrode layers.

Preferably, the impregnator is operable to form non-conducting impregnation regions in the electrode layers.

Preferably, the non-conducting regions define a border closing a region of the layer.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF THE PREFERRED EMBODIMENTS

Figure 1:
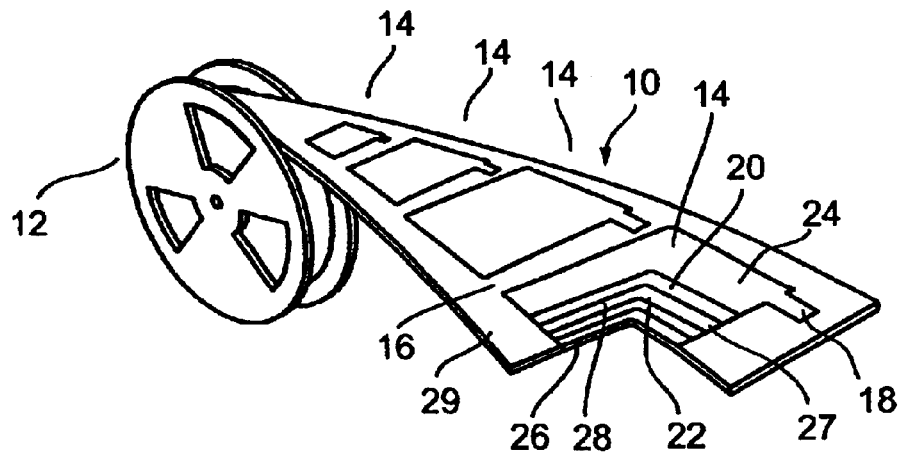
FIG. 1 is a cutaway drawing of a length of a first kind of a prior art flexible thin layer electrochemical cells arranged in a roll.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is now made to FIG. 1, which is a cutaway drawing of a length of a first kind of prior art flexible thin layer electrochemical cell as one of a series of cells in a roll 12. The length 10 comprises a plurality of individual cells 14 each having a positive terminal 16 and a negative terminal 18. Each cell has a positive electrode layer 20 and a negative electrode layer 22 and each electrode layer is associated with a current collector, respectively positive current collector 24 and negative current collector 26. Located between the positive and negative electrodes is a solid polymer electrolyte 28. The electrolyte is typically based on PEO, PAN, and PVDF-like materials.

Running around the outside of the cell 14 is a sealing compound 27 which seals the layers in contact for use. The arrangement is mounted on a carrier 29.

The sealing compound is generally added from the side after completing assembly of the layers.

Figure 2:
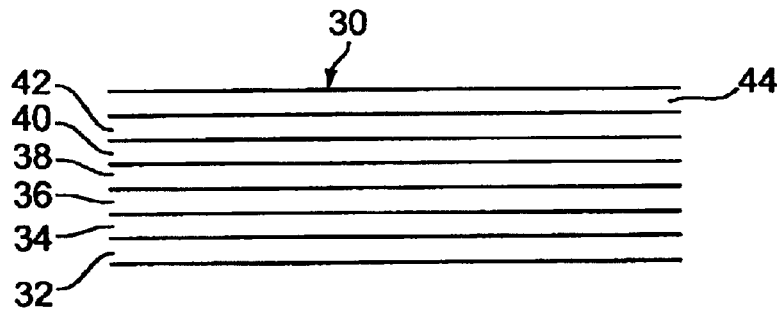
FIG. 2 is a cross-section of a second prior art flexible thin layer electrochemical cell.

Reference is now made to FIG. 2, which is a cross-section of a second prior art flexible thin layer electrochemical cell. In the embodiment of FIG. 2 a cell 30 comprises a first outer plastic layer 32, a negative current collector 34, a negative electrode 36 with electrolyte, a separator 38, a positive electrode 40 with electrolyte, a positive current collector 42 and a plastic layer 44.

Figure 3:
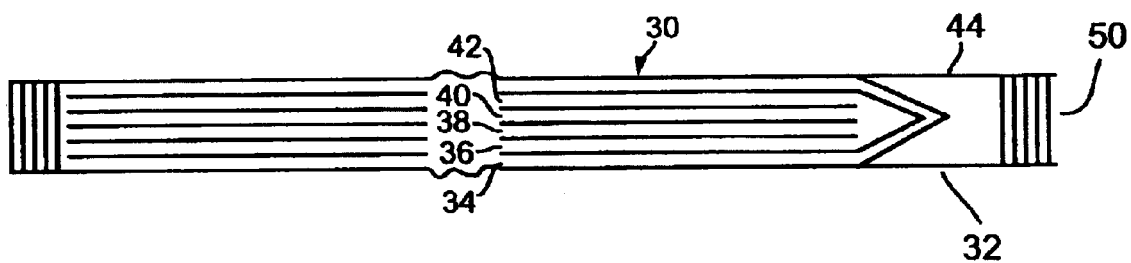
FIG. 3 is a cross-section of the prior art cell of FIG. 2, showing sealing from around the side.

Reference is now made to FIG. 3, which is an extended cross-section of FIG. 2 and shows how the device of FIG. 2 may be sealed. Parts that are identical to those shown above are given the same reference numerals and are not referred to again except as necessary for an understanding of the present embodiment. The internal layers are generally printed one upon the other and then the layers of plastic 32 and 44 are placed around the outside. The plastic layers extend outwardly of the other layers and a sealant 50 is applied around the edges between the plastic layers 32 and 44 to seal the cell 30. Application of the sealant may be carried out from around the edges. The sealant provides a non-conducting region and since the cell is sealed using a non-conducting region, the possibilities of short-circuiting are minimized.

Figure 4:
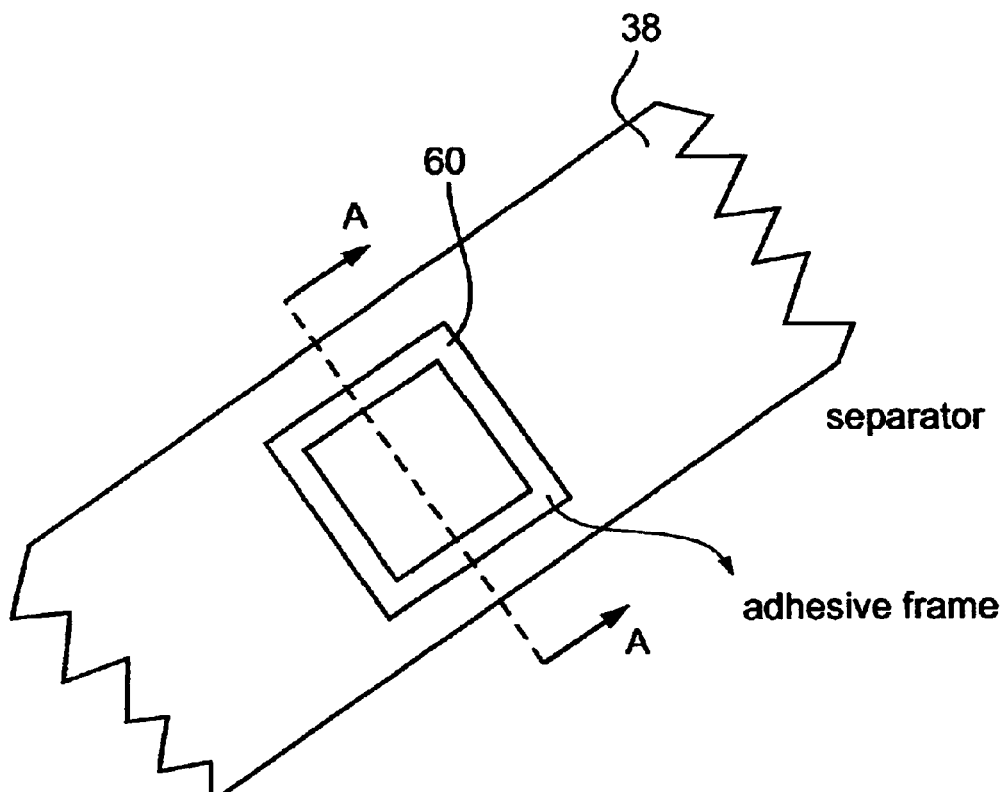
FIG. 4 is a view from above of a flexible thin layer electrochemical cell operative in accordance with a first embodiment of the present invention.

Reference is now made to FIG. 4, which shows a length of a separator 38, as for the device shown in FIGS. 2 and 3, but adapted to be operative in accordance with a first embodiment of the present invention. In the present embodiments, a liquid electrolyte is used and the solid separator is preferably soaked with the liquid electrolyte.

As shown in FIG. 4, a square frame 60 is applied to the separator 38. The frame 60 preferably comprises adhesive material which is adsorbed into the separator and which extends outwards above and below of the separator. The adhesive material is a material designed for use in lamination processes, and the frame 60 is preferably applied to both sides of the separator 38. Suitable adhesive materials include hot melt materials of various types, hot melt pressure sensitive materials and UV curable pressure sensitive materials.

There are two main methods of impregnation, one of them being impregnation with a solution containing a dissolved impregnator and a solvent, followed by evaporating the solvent, and the second being impregnation with a liquid phase and then developing or curing by suitable radiation. This latter method uses low viscosity materials and requires curing by UV or other types of radiation, such as electron beam radiation. In order to absorb the material into the separator 38, and, as will be explained below, also into the other layers, a suitable impregnation agent is preferably used. Possible impregnation agents include polyisobutylene, ethyl cellulose, various fluoro polymers, acrylic resins, vinyl resins, and polyurethane.

Preferably, absorption of the adhesive into the separation layer forms a non-conductive sealed frame around the separator, and prevents leakage of electrolyte from the separator. Solvent-based systems generally use low viscosity materials and curing may be carried out using UV radiation or E.B.

Figure 5:
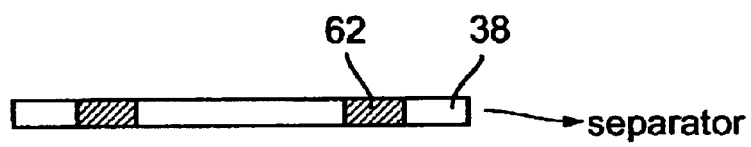
FIG. 5 is a cross-sectional view along line A—A of the embodiment of FIG. 4 during a first manufacturing step.

Reference is now made to FIG. 5, which is a simplified diagram of a section taken along line A—A in FIG. 4, showing impregnation within the separator layer 38. Parts that are identical to those shown above are given the same reference numerals and are not referred to again except as necessary for an understanding of the present embodiment. The combination of the adhesive and the impregnation agent causes impregnation of the separator 38 to bring about a sealant or impregnation region 62 within the separator 38. The impregnation region around the separator is preferably non-conductive, as mentioned above and prevents leakage of electrolyte from the separator. As will be explained below, the effect of the frame and the lamination process produces a similar result on each of the other layers.

Figure 6:
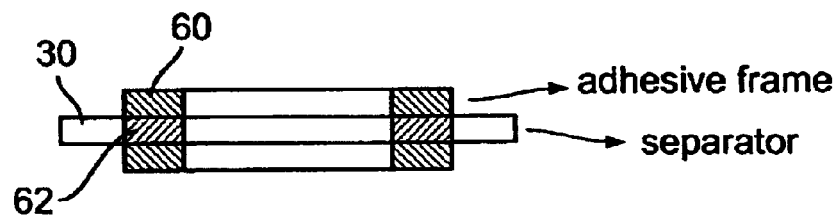
FIG. 6 is a cross-sectional view along line A—A of the embodiment of FIG. 4 during a second manufacturing step.

Reference is now made to FIG. 6, which is a simplified diagram of a section taken along line A—A in FIG. 4 following absorption. Parts that are identical to those shown above are given the same reference numerals and are not referred to again except as necessary for an understanding of the present embodiment. FIG. 6 shows the addition of the frame 60 over the impregnation region 62 on either side thereof, in readiness for a stage of lamination during which further layers may be applied on either side of the separator 38.

Figure 7:
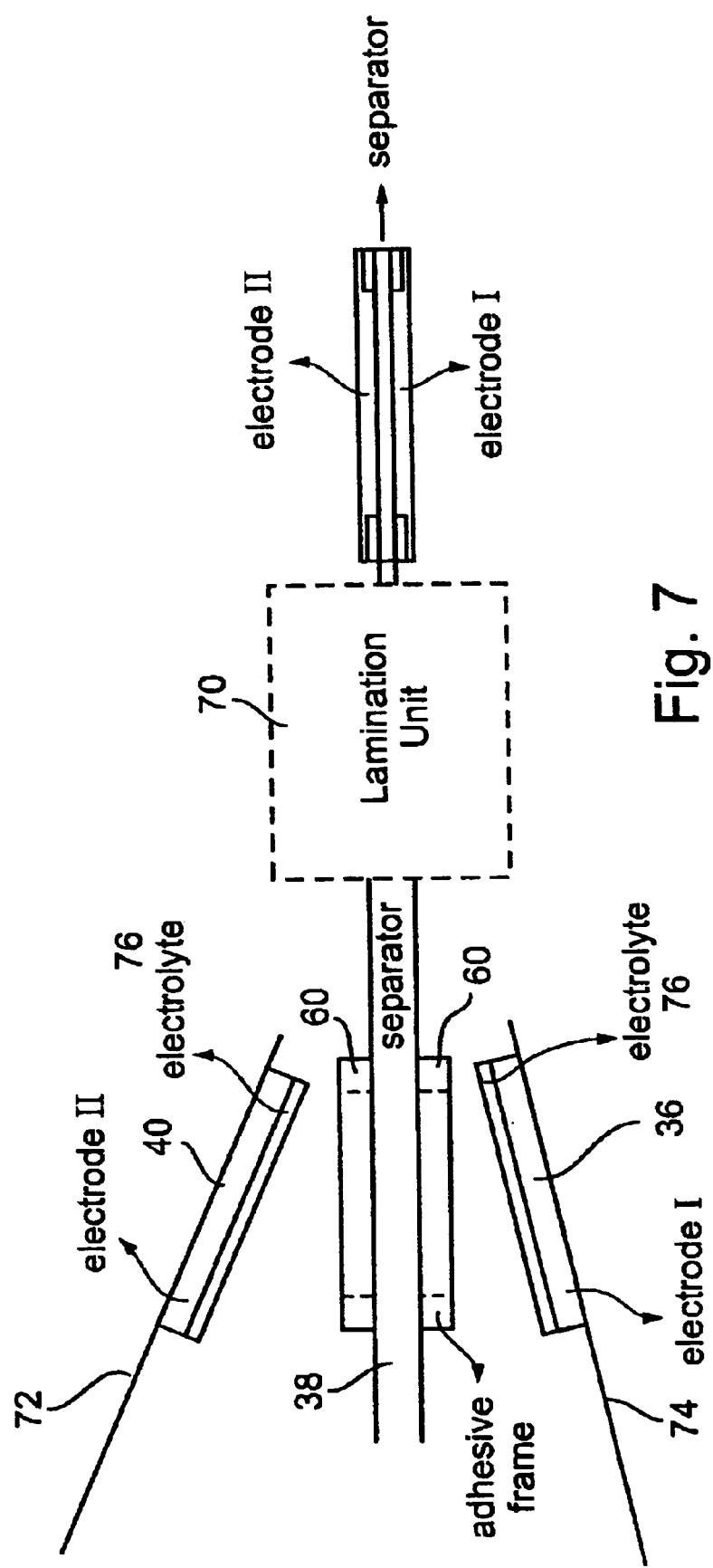
FIG. 7 is a simplified view of a lamination step in the manufacture of a flexible thin-layer electrochemical cell operative in accordance with embodiments of the present invention.

Reference is now made to FIG. 7, which is a simplified diagram showing a lamination step in the manufacturing process of a cell according to the present invention. Parts that are identical to those shown above are given the same reference numerals and are not referred to again except as necessary for an understanding of the present embodiment. In the step of FIG. 7, a separator layer 38 having a frame 60 superimposed thereupon, is passed through a lamination unit 70, along with upper and lower electrode layers 72 and 74. The upper and lower layers each preferably comprise an electrode 36, 40, and preferably have a coating of electrolyte 76.

The lamination unit applies heat, pressure, UV, EB etc. or a combination thereof as appropriate for the materials being used and presses the layers together to laminate them. Preferably, the impregnation agent being used ensures that there is absorption of the adhesive of the frame 60 through the layers being laminated together such that each one of them has an impregnation region as shown in FIG. 5.

The adhesive frame 60 defines the borders between individual cells. As the positioning of the border is fully defined by just one of the layers, namely the separator 38, accurate alignment between the layers is preferably not required.

The lamination process preferably forms a continuous tape of the kind shown in FIG. 1. The tape can be cut along lines formed by the adhesive frame to form flexible battery cells. The edges of the cell are firmly fixed in a non-conducting and non-leaking medium which preferably extends right through the layers along the cutting region.

According to the above embodiments there is thus provided a flexible thin layer electrochemical cell and a method of using a lamination process for manufacture thereof, the cell having a plurality of layers including a first electrode layer and a second electrode layer with a separator interspersed therebetween and wherein the separator serves as a lead element upon which the other layers are laminated using an adhesive frame mounted on the lead element.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

What is claimed is:

1. A method of manufacturing a thin layer electrochemical cell comprising the steps of:
    providing a separator layer;
    providing a positive electrode layer,
    providing a negative electrode layer;
    impregnating said separator layer; and
    passing said positive electrode layer, said separator layer and said negative electrode layer through a lamination unit so as to laminate said positive and negative electrode layers onto said separator layer.

2. A method according to claim 1 further comprising the step of impregnating a non-conductive material to form a non-conductive region within at least one of said layers.

3. A method according to claim 1, wherein the step of laminating further comprises impregnating a non-conductive material to form a non-conductive sealed region within at least one of said layers.

4. A method according to claim 2, wherein said non-conductive region is formed as a border defining an outer boundary of said cell.

5. A method according to claim 4, wherein said non-conductive region extends through at least two of said layers.

6. A method according to claim 5, wherein said non-conductive region extends through all three of said layers.

7. A method according to claim 1, wherein the thin layer electrochemical cell is an open thin layer electrochemical cell.

8. A method according to claim 1, comprising the step of applying a partial layer of non-conductive material to the separator layer.

9. A method according to claim 8, wherein said non-conductive material is an adhesive material.

10. A method according to claim 9, wherein said adhesive material is any one of a group comprising urethane acrylate, epoxy acrylate, other cross-linked acrylates, and cured acrylates.

11. A method according to claim 8, comprising the step of adding an impregnation agent to said partial layer.

12. A method according to claim 11, wherein said impregnation agent is selected from the group consisting of polyisobutylene, ethyl cellulose, a fluoro polymer, an acrylic resin, a vinyl resin, and polyurethane.

13. A method according to claim 9, wherein said non-conductive material is selected from the group consisting of a hot melt material, a hot melt pressure sensitive material and a UV curable pressure sensitive material.

14. A method of manufacturing a thin layer electrochemical cell comprising the steps of:
    providing a separator layer;
    adding an impregnation agent to said separator layer, said impregnation agent being selected from the group consisting of polyisobutylene, ethyl cellulose, a fluoro polymer, an acrylic resin, a vinyl resin and polyurethane;
    providing a positive electrode layer;
    providing a negative electrode layer; and
    laminating together said positive and negative electrode layers onto said separator layer.

15. A method of manufacturing a thin layer electrochemical cell comprising the steps of:
    providing a separator layer;
    applying a partial layer of non-conduction material to the separator layer;
    adding an impregnation agent to said partial layer, said impregnation agent being selected from the group consisting of polyisobutylene, ethyl cellulose, a fluoro polymer, an acrylic resin, a vinyl resin and polyurethane;
    providing a positive electrode layer;
    providing a negative electrode layer; and
    laminating together said positive and negative electrode layers onto said separator layer.

* * * * *